United States Patent [19]
Ringo

[11] 3,861,290
[45] Jan. 21, 1975

[54] BARBECUING APPARATUS

[76] Inventor: Acey Ringo, 320 E. 47th St., Chicago, Ill. 60615

[22] Filed: June 29, 1972

[21] Appl. No.: 267,643

[52] U.S. Cl................................ 99/427, 99/421 P
[51] Int. Cl.............................................. A47j 37/04
[58] Field of Search............ 99/427, 339, 393, 421, 99/426, 443

[56] References Cited
UNITED STATES PATENTS

| | | | |
|---|---|---|---|
| 2,696,163 | 12/1954 | Galley | 99/421 P X |
| 2,735,358 | 2/1956 | Gilbert | 99/427 |
| 2,925,771 | 2/1960 | Avetta | 99/427 UX |
| 3,055,288 | 9/1962 | Aaronson | 99/427 |
| 3,372,636 | 3/1968 | Marasco | 99/427 |
| 3,665,840 | 5/1972 | Horany | 99/339 X |
| 3,792,654 | 2/1974 | Turner | 99/427 |

*Primary Examiner*—Robert L. Bleutge
*Assistant Examiner*—Arthur O. Henderson

[57] ABSTRACT

Barbecuing apparatus having a plurality of broiling trays arranged to rotate about a common axis. The trays are circumferentially spaced about a rotary shaft, extend radially with respect thereto, and are releasably mounted on disks and arms attached to the disks. The disks are mounted on and driven by the rotary shaft. Below the trays a bed for charcoal is located which heats the food in the trays. The charcoal fire is controlled by water directed at the fire through a plurality of quenching nozzles. Smoke rising from the trays is scrubbed by a high-velocity water mist supplied by a nozzle assembly above a fine-mesh screen through which the smoke passes.

8 Claims, 8 Drawing Figures

3,861,290
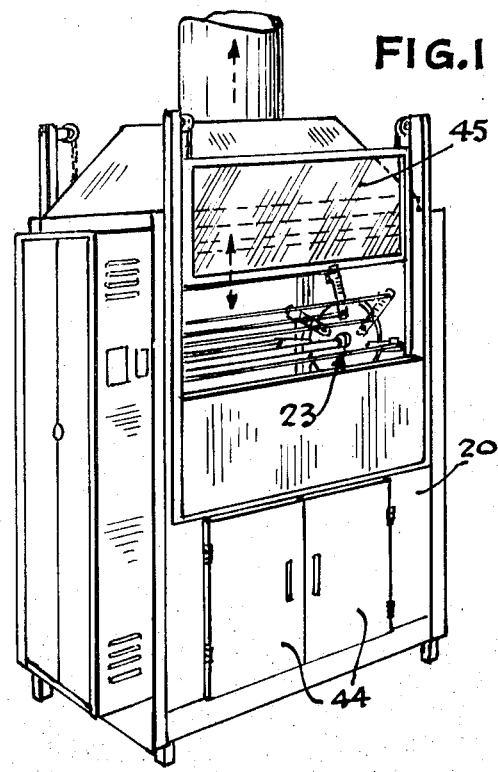
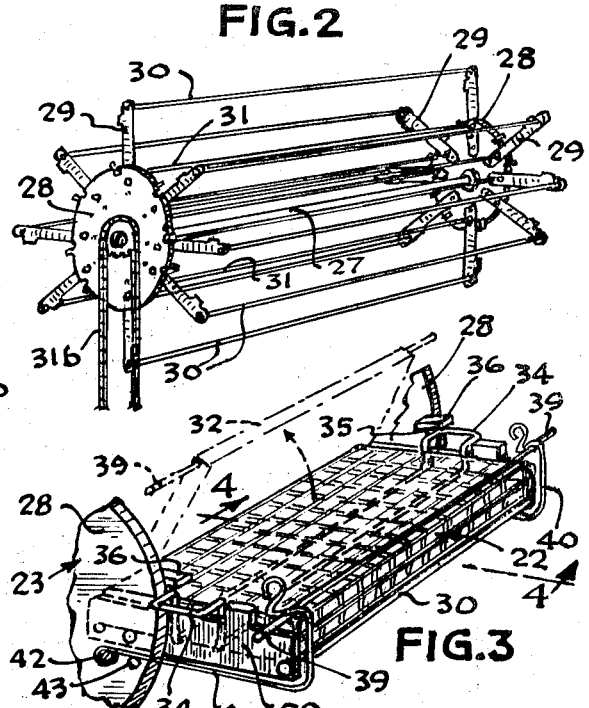
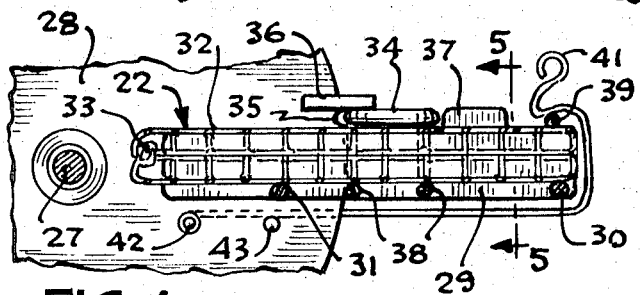
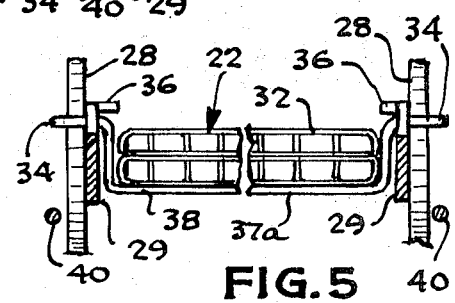
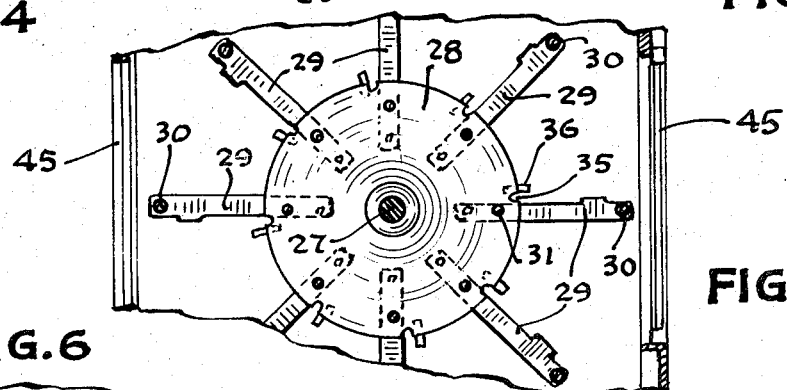
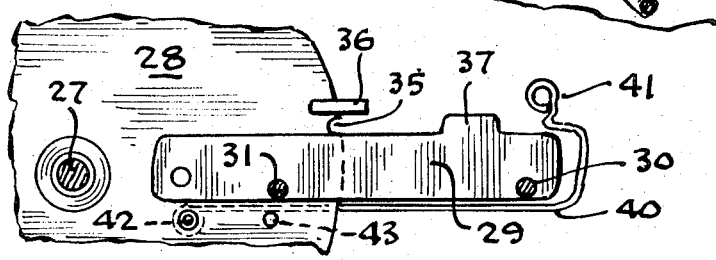

BARBECUING APPARATUS

This invention relates to a cooking apparatus in which food trays rotate about a common axis over a source of heat. More specifically, the invention relates to mounting of the trays as well as to the control of heat in the cooking apparatus.

IN THE DRAWINGS:

FIG. 1 is a perspective view of the cooking apparatus of the present invention;

FIG. 2 is a fragmentary perspective view of a shaft, disks, and arms employed for mounting and rotating the food trays in the present apparatus;

FIG. 3 is a perspective fragmentary view showing how a food tray is mounted.

FIG. 4 is a transverse sectional view taken on line 4—4 of FIG. 3, showing the food tray as well as the arm and disk mounting one end of the tray;

FIG. 5 is a longitudinal sectional view taken on line 5—5 of FIG. 4, showing the food tray and also the disks and arms mounting the two ends of the tray;

FIG. 6 is a sectional view similar to FIG. 4 but without the food tray present;

FIG. 7 is a fragmentary vertical sectional view showing the relationship of windows in the cooking apparatus to the arms and disks that mount the food trays.

Figure 8:
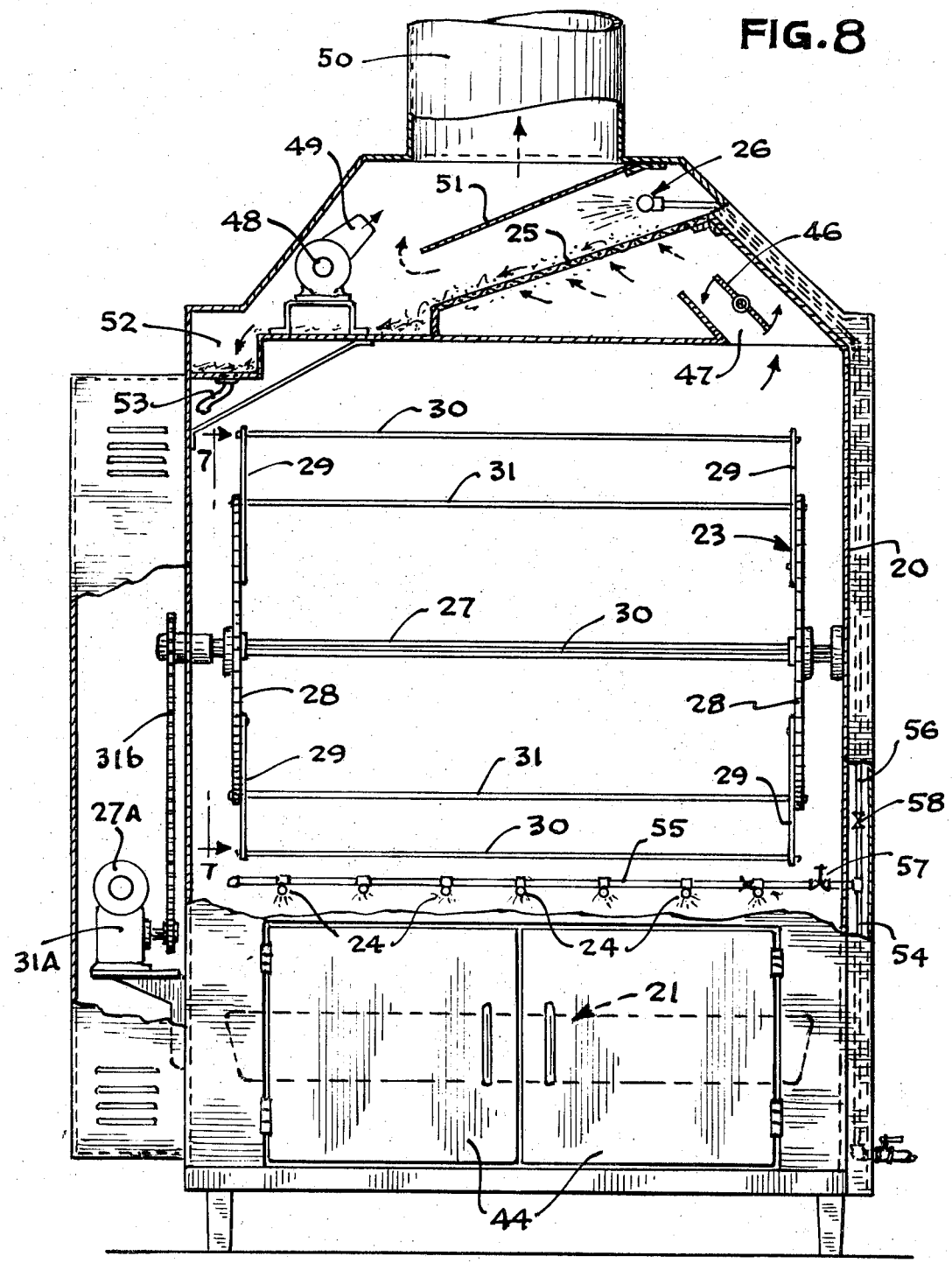
FIG. 8 is an elevational view, partly in section, of the cooking apparatus.

As shown in FIGS. 1, 2, 3, and 8, the barbecuing apparatus of the present invention comprises a stainless steel casing 20, a bed 21 located therein near the bottom for supporting fuel such as charcoal, a plurality of stainless-steel trays 22, one being shown in FIG. 3, an assembly 23 located in the casing 20 above the bed 21 for mounting and rotating the trays 22, a plurality of quenching nozzles 24 for supplying water to control the burning of the charcoal on the bed 21, a screen 25 located within and near the top of the casing 20 for passing smoke rising from the trays 22, and a nozzle assembly 26 for delivering high-velocity water mist to scrub the smoke directly after it passes through the screen 25.

The assembly 23 which mounts and rotates the trays 22, comprises a rotary driving shaft 27 driven by an electric motor 27a, two disks 28 secured near the ends of the shaft 27 adjacent the end walls of the casing 20, two sets of radial arms 29, one set to a disk, secured as by riveting to the disks 28 and extending radially outward thereof, outer rods 30 parallel to the driving shaft 27 and secured at their ends to the outer ends of the arms 28, and inner rods 31 parallel to the shaft 27 and secured at their ends to the arms 29 at regions within the peripheries of the disks 28. The shaft 27 has its ends journalled in bearings carried by end walls of the casing 20. The motor 27a acts through a change-speed device 31a and a sprocket chain 31b to drive the shaft 27 at varying speeds and in two directions.

As shown in FIG. 2, the arms 29 of each set are generally equally circumferentially spaced from one another about the associated disk 28 and may be eight in number for carrying the same number of trays 22, also generally equally circumferentially spaced about the disks 28 and the driving shaft 27.

As shown in FIGS. 3 and 4, each tray 22 is in the form of a basket having a top 32 which may be pivoted to open position as shown in dotted lines in FIG. 3 by swinging about a hinge 33 located at the radially inner end of the basket. The bottom of each tray or basket 22 rests on the associated outer and inner rods 30 and 31.

As shown in FIGS. 3, 4, and 5, each basket 22 has two handles 34, one to an end, each of which engages the top of an associated arm 29, has its radially inner side in a recess 35 formed in the periphery of the associated disk 28, is overlapped by a projection 36 secured as by welding or soldering to the inner side of the disk 28 and projecting outwardly therefrom immediately adjacent the recess 35 in spaced relation to the top of the arm 29, and has its radially outer side directly facing a raised portion 37 formed on the top of the associated arm 29. The handles 34 of each pair are part of a long narrow wire loop 37a having two spaced parallel longitudinal legs 38 which are secured as by welding or soldering to the base of the tray 22 and extend the length thereof and upward at the ends of the tray to the top thereof. Thence the legs 37a extend beyond the ends of the tray 22 and terminate in connections with one another parallel to and spaced from the ends of the tray, thereby forming the handles 34.

The top 32 of each tray 22 has secured to it as by welding or soldering adjacent the radially outer edge of the tray, a rod 39 which extends lengthwise of the tray 22 and beyond its ends. At each projecting end of the rod 39, there is a spring-like member 40 which hooks over the projecting end of the rod, has a manipulating loop 41 at its outer end, is located at the outer side of the associated arm 29 away from the associated basket 22, and has its inner end pinned to the associated disk 28 as indicated at 42 and an adjacent region supported on a member 43 projecting from the outer side of the disk 28.

Reference is again made to FIGS. 3, 4, and 5. When the trays 22 are connected in operative position in the barbecuing apparatus, the bottom of each tray engages the two associated outer and inner rods 30 and 31, and the handles 34 of the tray engage the tops of the associated arms 29, the raised portions 37 thereon, and the associated recesses 35 and projections 36 on the disks 28. At the same time the associated spring-like members 40 are hooked over the protruding ends of the rod 39 on the top 32 of the tray 22. The hooking of the members 40 over the ends of the rod 39 not only holds the tray 22 in place, but also keeps the top 32 of the tray closed. For removal of the tray, the members 40 are bent so as to unhook the rod 39 by suitable forces applied at the loops 41. Thereupon the tray may be lifted out. For reconnection of tray 22, the spring like members 40 are bent out of the way and the tray is slipped back into place. The various trays 22 are simply and firmly held in radial mounting about the shaft 27, and they are easily connected and disconnected from such radial mounting.

Charcoal is burned on the bed 21 to heat and cook meat in the rotating trays 22. The charcoal may be supplied to the bed 21 through hinged doors 44 at the front of the casing 20. Alternately, the meat in the trays 22 may be heated by burning gas below the trays, the gas being supplied to the casing 20 by means not shown. One may watch meat being cooked in the rotating trays 22 through windows 45 which, as shown in FIGS. 1 and 7, are slidably mounted at opposite sides of the casing 20. When the trays 22 are to be removed from or applied to the driving assembly 23, one or both windows 45 are slid upwards to open position for access to the trays.

Gases rising from the rotating trays 22 during operation are scrubbed of smoke, cooking meat odors, and particulate matter by the high velocity water mist delivered by nozzle assembly 26 to the gases as they pass through the screen 25. As shown in FIG. 7, the passage of gases from the top of the casing 20 is controlled by a manually regulatable damper 46 mounted in a short passageway 47 in the upper end of the casing, and by a fan 48 having an outlet 49 directing the gases up a vent 50. For control purposes a baffle 51 is located between the screen 25 and the vent 50. The nozzle assembly 26 is actually formed of a water pipe that extends perpendicularly to the plane of the paper in FIG. 7 and a plurality of nozzles connected to the line along the length thereof. Water accumulating from the mist supplied by the nozzle assembly 26 is drained off through a gutter 52 and a drain line 53 connected thereto.

Water for the quenching nozzles 24 and the nozzle assembly 26 producing the cleansing water mist is supplied by a line 54, which has branches 55 and 56, quenching nozzles 24 being connected to branch 55 and nozzle assembly 26 to branch 56. Branch 55 has an externally controlled valve 57 regulating the quenching nozzles 24. Branch 56 has an externally controlled valve 58 regulating the nozzle assembly 26.

It is to be noted that the trays carrying the meat to be cooked in the present apparatus have a simple movement of rotation about the shaft 27 of the driving assembly 23. A very effective and satisfactory cooking of the meat occurs in spite of the simple motion of the trays 22, because the cooking is carried out in the enclosure provided by the casing 20, and there is a slow movement of the gases through the casing 20 due to the control of the charcoal fire on the bed 21 by the quenching nozzles 24 and due to the resistance offered to gaseous flow by the fine mesh of the screen 25.

Those skilled in the art will readily utilize the teachings of the foregoing invention in ways in addition to and beyond those here described, and it is therefore intended that the scope of the present invention be limited not by the foregoing disclosure, but rather only by the appended claims.

I claim:

1. Barbecuing apparatus comprising a heat source, a rotary shaft located above and in spaced relation to the heat source, a plurality of trays disposed about the shaft so as to extend radially outward therefrom in circumferentially spaced relation to one another, each tray being formed of a basket with an openable top, a pair of disks secured to the shaft so as to rotate therewith and located beyond radially extending ends of the trays, the peripheries of the disks lying radially inward of the outer side edges of the trays, two pluralities of radial arms, each plurality being equal in number to the trays, the arms of one plurality being secured to one disk and those of the other plurality to the other disk, each arm extending radially beyond the periphery of the associated disk along an adjacent radially extending end of one tray about to the outer side edge thereof, and means associated with the disks and the arms for removably connecting the baskets thereto.

2. Barbecuing apparatus as specified in claim 1, the means for removably connecting the baskets to the disks and arms comprising a plurality of pairs of rods generally parallel to the shaft, one pair for each tray, the rods of each pair extending along the bottom of the asssociated tray, one rod of each pair having its ends secured adjacent the outer ends of the associated arms, the other rod of each pair being secured to the associated arms inward of the periphery of the disks.

3. Barbecuing apparatus as specified in claim 2, the means for removably connecting the baskets to the disks and arms further comprising a plurality of pairs of handles, a pair of handles for each tray, one handle of each pair being secured to the top of one end of the associated tray and extending therebeyond so as to engage the adjacent arm and the associated disk adjacent its periphery, the other handle of each pair being similarly secured to the other end of the associated tray and engaging the arm and disk of the said other end of the associated tray.

4. Barbecuing apparatus as specified in claim 3, the handles secured to each tray being formed of a long narrow wire loop having two spaced parallel legs secured to the base of the tray, extending the length thereof, upwards at the ends of the tray, thence outward beyond the ends, and finally terminating in connections with one another parallel to and spaced from the ends of the tray.

5. Barbecuing apparatus as specified in claim 4, the means for removably connecting the baskets to the disks and arms further comprising a plurality of short projections attached to the disks and extending radially outward of the peripheries thereof in closely spaced relation to the arms, the handles on the trays fitting between the arms and the projections.

6. Barbecuing apparatus as specified in claim 5, the means for removably connecting the baskets to the disks and arms further comprising recesses formed in the peripheries of the disks between the arms and the short projections attached to the disks, said means still further comprising raised portions formed on the arms at regions radially outward of the disks, the recesses receiving the radially inner sides of the handles, the raised portions on the arms directly facing the radially outer sides of the handles.

7. Barbecuing apparatus as specified in claim 3, the means for removably connecting the baskets to the disks and arms further comprising a plurality of spring-like members, one to an arm, having their inner ends connected to the disks, and their outer ends hooking over the trays adjacent their ends and radially outer edges.

8. Barbecuing apparatus as specified in claim 5, the means for removably connecting the baskets to the disks and arms further comprising a plurality of spring-like members, one to an arm, having their inner ends connected to the disks, and a plurality of rods, one to a tray, secured to the tops of the trays at the outer edges of the trays and extending beyond the ends of the trays, the spring-like members hooking over the portions of the last mentioned rods beyond the ends of the trays and serving not only to retain the trays but also to keep them shut.

* * * * *